United States Patent Office 3,658,796
Patented Apr. 25, 1972

3,658,796
5-NITROFURAN DERIVATIVES
Herbert Berger, Mannheim-Kafertal, Kurt Stach, Mannheim-Waldhof, Otto Dold, Ilvesheim Deidesheimer, Wolfgang Voemel, Mannheim, and Winfriede Sauer, Mannheim-Wallstadt, Germany, assignors to Boehringer-Mannheim GmbH, Mannheim, Germany
No Drawing. Filed Mar. 4, 1969, Ser. No. 804,299
Claims priority, application Germany, Apr. 10, 1968, P 17 70 169.8; Dec. 6, 1968, P 18 13 120.9
Int. Cl. C07d *31/42*
U.S. Cl. 260—240 A 8 Claims

ABSTRACT OF THE DISCLOSURE

Novel nitrofuran derivatives, their N-oxides and their physiologically acceptable salts having the formula:

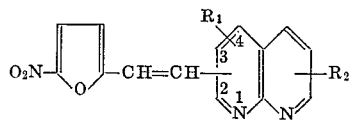

wherein $R_1$ and $R_2$ each represent hydrogen, halogen, hydroxyl, azido, amino-lower alkyl, lower acyloxy, lower alkoxy, lower alkylamino, hydroxyalkylamino, lower acylamino, or sulfonylamino.

The nitrofuran derivatives of the above formula constitute particularly effective antibacterial agents and are especially useful in the treatment of urinary tract infections.

---

This invention relates to 5-nitrofuran derivatives, methods of producing and using the same.

According to the invention there is provided a novel group of compounds having the formula:

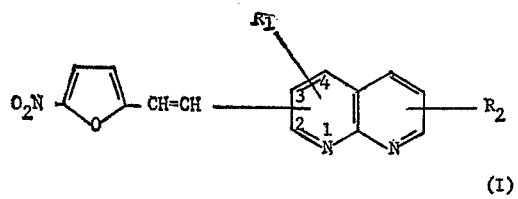

wherein $R_1$ and $R_2$, which may be the same or different, each represent hydrogen, halogen, hydroxyl, azido, amino, lower alkyl, lower acyloxy, lower alkoxy, lower alkylamino, hydroxyalkylamino, lower acylamino or sulfonylamino radicals, the N-oxides and salts thereof.

The compounds (I) of this invention possess a markedly high germistatic effectiveness. It is to be considered particularly surprising that the novel nitrofuran derivatives according to the present invention are particularly effective against *Proteus mirabilis* and *Pseudomonas aeruginosa* since, as is well known, it is precisely these strains of bacteria which are most difficult if not impossible to combat medicinally. This unexpected activity makes the new nitrofuran derivatives according to the present invention especially useful medicaments, and in particular as medicaments for use in the treatment of infections of the urinary tract and for general local administration.

The compounds (I) of the invention can be prepared, for example, by reacting 5-nitrofuran-2-aldehyde or a reactive derivative thereof with a compound having the formula:

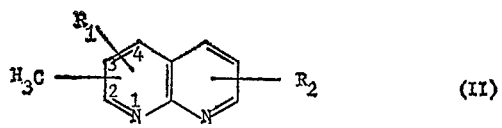

wherein $R_1$ and $R_2$ each have the same significance as given above, or with an N-oxide thereof in the presence of an agent for splitting off the elements of water. The product obtained, insofar as it is not an N-oxide, is, if desired, thereafter oxidized to form the corresponding N-oxide or is converted into a salt.

In the production of the novel nitrofuran derivatives (I), it is particularly preferred to use, as starting materials, those compounds of Formula II in which the methyl group is in the 2- or 4-position, the substituent $R_1$ preferably occupying either the 2- or 4-position which does not carry the methyl group.

If either of the substituents $R_1$ or $R_2$ is in the 2- or 7-position and represents an azido group, then the compound can also be present in the isomeric tetrazole form.

The condensation according to the present invention of 5-nitrofuran-2-aldehyde with the compound of Formula II is preferably carried out with the use of an acidic condensation agent, as for example, with acetic anhydride, glacial acetic acid, mineral acids, anhydrous zinc chloride or with mixtures thereof.

In place of the 5-nitrofuran-2-aldehyde, there can also be used its reactive derivatives, such as its acetals or diacetate.

It is also possible if it is desired, to introduce the substituents $R_1$ and $R_2$ after the condensation reaction has taken place or to convert existing substituents into desired substituents $R_1$ and $R_2$ after the condensation reaction has been carried out. Thus, for example, an amino group can be liberated from an acetamino group by acid hydrolysis, an azido group can be introduced by the reaction of a halogen substituent with sodium azide and an amino group can be converted into a hydroxyl group by diazotization followed by boiling.

The nitrofuran derivatives can be converted into their N-oxides by the conventional methods before or after the condensation reaction, for example, by reaction with a reactive peroxide, such as for example, benzoic peracid.

The physiologically compatible salts of the nitrofuran derivatives (I) are formed by contacting the nitrofuran derivative with a mineral acid such as hydrochloric acid, hydriodic acid, nitric acid, phosphoric acid, sulfonic acid, and sulfuric acid; and organic acids such as acetic acid, citric acid, tartaric acid, lactic acid, oxalic acid, methanic sulfonic acid ethane sulfonic acid, quinic acid and the like.

Illustrative examples of the new compounds of the invention and their preparation are as follows, the same, however, are not to be construed as limitative of the scope of the invention.

EXAMPLE 1

2-[2-(5-nitro-2-furyl)-vinyl]-7-acetamido-1,8-naphthyridine

.8 g. 2-methyl-7-amino-1,8-naphthyridine (M.P. 170–180° C.) were boiled under reflux for 30 minutes in 105 ml. acetic anhydride. 11 g. 5-nitrofuran-2-aldehyde were then added and the reaction mixture boiled for another hour. Following cooling, the precipitated cvrystals were filtered off with suction, washed with glacial acetic acid and recrystallized, with the addition of activated charcoal, from dimethyl formamide. There were obtained 13.66 g. 2-[2 - (5-nitro-2-furyl)-vinyl]-7-acetamido-1,8-naphthyridine, which had a decomposition point of 285–287° C.

EXAMPLE 2

2-[2-(5-nitro-2-furyl)-vinyl]-7-amino-1,8-naphthyridine 13.66 g. 2-[2-(5-nitro-2-furyl)-vinyl]-7-acetamido-1,8-naphthyridine, prepared by the procedure described in Example 1 were saponified for one hour under reflux (bath temperature 120° C.) in a mixture of 47 ml. 5 N hydrochloric acid and 47 ml. glacial acetic acid. Following cooling, the precipitated crystalline hydrochloride was filtered off with suction and washed with dilute hydrochloric acid. There were recovered 11.45 g. 2-[2-(5-nitro-2-furyl)-vinyl]-7-amino-1,8-naphthyridine hydrochloride.

For conversion into the free base, the hydrochloride was dissolved in 180 ml. of a boiling mixture of 80% dimethyl formamide and 20% 2 N hydrochloric acid and the solution thereby formed poured, while stirring, into an excess of an aqueous solution of ammonia. The precipitated crystals were filtered off with such, thoroughly washed with water, dried (yield 9.5 g.) and recrystallized from 130 ml. 80% aqueous dimethyl formamide, with the addition of activated charcoal. There was thusly obtained pure 2-[2-(5-nitro-2 - furyl)-vinyl]-7-amino-1,8-naphthyridine, which had a melting point of 253° C. (decomp.).

EXAMPLE 3

2-[2-(5-nitro-2-furyl)-vinyl]-7-hydroxy-1,8-naphthyridine 2 g. 2 - [2-(5-nitro-2-furyl)-vinyl-7-amino-1,8-naphthyridine, prepared by the procedure described in Example 2, were dissolved at 50° C. in 80 ml. semi-concentrated sulfuric acid (60% by weight). Thereafter a solution of 1.5 g. sodium nitrite in 7 ml. water was slowly added dropwise, while stirring, at 45–50° C. After completion of the addition of the nitrite solution, the reaction mixture was stirred further for 45 minutes, during which time the reaction mixture cooled to ambient temperature. The precipitated yellow crystals which formed were filtered off with suction, washed with ammoniacal water and dried under vacuum at 90° C. There were thusly obtained 1.86 g. of product. Following recrysttallization from 20 ml. dioxan-dimethyl formamide (7:3), with the addition of activated charcoal, there were obtained 1.24 g. pure 2-[2-(5-nitro - 2 - furyl)-vinyl] - 7 - hydroxy - 1,8 - naphthyridine, which had a melting point of 234–236° C. (decomp.).

EXAMPLE 4

2-[2-(5-nitro-2-furyl)-vinyl]-7-azido-1,8-naphthyridine 2.75 g. 6-methyl-tetrazolo-[1,5-a]-pyrido-[2,3-e]pyridine (the isomeric form of 2-methyl-7-azido-1,8-naphthyridine) were reacted with 3.25 g. 5-nitrofuran-2-aldehyde by heating under reflux (bath temperature 160° C.) for 8 hours in a mixture of 25 ml. acetic anhydride and 2 ml. glacial acetic acid. After cooling, the olive-yellow crystals which were thereby formed were filtered off with suction and dried under vacuum at 90° C. (yield 2.8 g.) After recrystallization from 28 ml. dimethyl formamide, with the addition of activated charcoal, there were obtained 1.1 g. 2-[2-(5-nitro-2-furyl) - vinyl]-7-azido-1,8-naphthyridine, which had a melting point of 250–275° C. (decomp.). Infra-red spectrum analysis established that the substance was preponderantly present in the tetrazole form.

The 6-methyl-tetrazolo-[1,5-a]-pyrido-[2,3-e]-pyridine used as starting material was prepared in the following manner:

3.2 g. 2-methyl-7-chloro-1,8-naphthyridine were boiled under reflux for 2 hours with a mixture of 18 ml. ethanol and 6 ml. hydrazine hydrate. The solvent was then separated off in vacuo, the residue triturated with ice water and the crystals which separated out filtered off using suction. After washing with water and drying in a vacuum at 80° C., there were obtained 2.65 g. 2-methyl-7-hydrazino-1,8-naphthyridine. 1.74 g. of this compound were then dissolved in 15 ml. 12% aqueous acetic acid. There was introduced into the resulting solution, in dropwise fashion at 0° C. while stirring, a solution of 0.7 g. sodium nitrite in 5 ml. water. After stirring for 30 minutes at 0° C., the precipitated crystals which separated out were filtered off with suction and washed with water. After drying, there was obtained 2-methyl-7-azido-1,8-naphthyridine or its isomeric 6-methyl-tetrazolo-[1,5-a]-pyrido-[2,3-e]pyridine in crystalline form (M.P. 233–234° C. (decomp.)), which could be used without further purification.

EXAMPLE 5

4-[2-(5-nitro-2-furyl)-vinyl]-2,7-diacetamido-1,8-naphthyridine 3.48 g. 4-methyl-2,7-diamino-1,8-naphthyridine were boiled under reflux (bath temperature 160° C.) for 30 minutes in 80 ml. acetic anhydride. 4.3 g. 5-nitrofuran-2-aldehyde were then added and the reaction mixture boiled for 3 hours. Following the introduction of an additional 2 g. of 5-nitrofuran-2-aldehyde, boiling was continued for a further 5 hours. The reaction mixture was then allowed to cool, the precipitated crystals filtered off with suction and successively washed with glacial acetic acid and ether. There were thusly obtained 5.43 g. 4-[2-(5-nitro-2-furyl)-vinyl]2,7-diacetamido - 1,8 - naphthyridine.

The 4-methyl-2,7-diamino-1,8-naphthyridine used as starting material was prepared by the following procedure.

13 g. 4-methyl-2,7-dichloro-1,8-naphthyridine were heated for 4 hours at 200° C. in an autoclave together with a mixture of 60 ml. methanol and 50 g. liquid ammonia. Following the evaporation of the resulting suspension under vacuum, the residue which remained was slurried in 35 ml. water and, while being cooled, mixed portionwise with 45 ml. concentrated sodium hydroxide solution. After an hour had elapsed, the reaction mixture was filtered with suction and the solid product washed three times with 10 ml. amounts of ice water. There were thusly obtained 10.85 g. 4-methyl-2,7-diamino-1,8-naphthyridine. After recrystallization from dioxan-dimethyl formamide (8:2), the recovered compound had a melting point of 248–250° C.

EXAMPLE 6

4-[2-(5-nitro-2-furyl)-vinyl]-2,7-diamino-1,8-naphthyridine 5 g. 4-[2-(5-nitro-2-furyl)-vinyl]-2,7-diacetamido-1,8-naphthyridine, prepared by the method described in Example 5, were heated for one hour at 100° C. in a mixture of 20 ml. glacial acetic acid and 20 ml. 5 N hydrochloric acid. After cooling the reaction mixture, the precipitated hydrochloride was filtered off with suction, washed with water, suspended in a little water and mixed with a concentrated solution of ammonia until it showed a strongly basic reaction. The precipitated crystals were then filtered off with suction, washed and dried. The yield amounted to 3.6 g. After recrystallization from 160 ml. 90% dimethyl formamide, there were obtained 1.8 g. of orange-red 4 - [2 - (5-nitro-2-furyl)-vinyl]-2,7-diamino-1,8-naphthyridine, which had a melting point of 295° C. (decomp.).

EXAMPLE 7

4-[2-(5-nitro-2-furyl)-vinyl]-2,7-dihydroxy-1,8-naphthyridine 1.7 g. 4 - [2 - (5 - nitro-2-furyl)-vinyl]-2,7-diamino-1,8-naphthyridine, prepared by the procedure set out in Example 6, were diazotized and boiled as described in Example 3. There were thusly obtained 1.3 g. olive colored, sparingly soluble 4 - [2 - (5-nitro-2-furyl)-vinyl]-2,7-dihydroxy - 1,8 - naphthyridine, the decomposition point of which was 318° C.

EXAMPLE 8

2-[2-(5-nitro-2-furyl)-vinyl]-7-hydroxy-1,8-naphthyridine-N-oxide 0.5 g. 2-[2-(5-nitro-2-furyl)-vinyl]-7-hydroxy-1,8-naphthyridine, prepared by the method described in Example 3, were dissolved in 15 ml. dimethyl formamide and the resulting solution mixed with a solution of 0.67 g. benzoic peracid in 5 ml. methylene chloride. The resulting reaction mixture was then heated to 60° C. for 3 hours. Thereafter, and this procedure was again repeated after an additional 2 hours had elapsed, at the same temperature there was added a portion of benzoic peracid (0.27 g. dissolved in 2 ml. methylene chloride). 2 hours following the addition of the last portion of benzoic peracid, the reaction mixture was allowed to cool. The precipitated yellow 2-[2-(5-nitro - 2 - furyl)-vinyl]-7-hydroxy-1,8-naphthyridine-N-oxide was filtered off using suction and washed with dioxan. There were thusly obtained 0.33 g. of the N-oxide, which had a melting point of 243–250° C. (decomp.).

EXAMPLE 9

2-[2-(5-nitro-2-furyl)-vinyl]-5-ethoxy-1,8-naphthyridine 9.4 g. 2-methyl-5-ethoxy-1,8-naphthyridine (M.P. 100–102° C.) and 7.05 g. 5-nitrofuran-2-aldehyde in 200 ml. acetic anhydride were heated for 2 hours at 80° C., under stirring. Following cooling of the reaction mixture, the precipitated crystals were filtered off with suction and recrystallized from glacial acetic acid. There were recovered 4.7 g. (30.2% of theory) 2-[2-(5-nitro-2-furyl)-vinyl]-5-ethoxy-1,8-naphthyridine, which had a melting point of 237° C. (decomp.).

The 2-methyl-5-ethoxy-1,8-naphthyridine used as starting material was prepared by the following method:

6.2 g. 2-methyl-5-chloro-1,8-naphthyridine were heated under reflux for one hour in a solution of sodium ethylate which had been prepared by dissolving 2 g. sodium in 50 ml. absolute ethanol. Thereafter the sodium chloride which had precipitated out was filtered off, the filtrate evaporated and the residue recrystallized from ligroin (B.P. 100–104° C.). There were obtained 2.7 g. (41.4% of theory) 2-methyl-5-ethoxy-1,8-naphthyridine, which had a melting point of 100–102° C.

EXAMPLE 10

2-[2-(5-nitro-2-furyl)-vinyl]-5-hydroxy-1,8-naphthyridine 3.6 g. 2 - methyl - 5 - hydroxy-1,8-naphthyridine (M.P. 244–246° C.) and 3.1 g. 5-nitrofuran-2-aldehyde in 200 ml. acetic anhydride were heated to 140° C. for 15 minutes, while stirring. After cooling the reaction mixture, the precipitated crystals were filtered off with suction and recrystallized from dimethyl formamide. There were obtained 2.3 g. (36.2% of theory) 2-[2-(5-nitro-2-furyl)-vinyl]-5-hydroxy-1,8-naphthyridine, which had a melting point of 318° C. (decomp.).

EXAMPLE 11

2-[2-(5-nitro-2-furyl)-vinyl]-5-chloro-1,8-naphthyridine 2.0 g. 2-methyl-5-chloro-1-8-naphthyridine (M.P. 116–118° C.) and 1.6 g. 5-nitrofuran-2-aldehyde in 200 ml. acetic anhydride were heated to 70° C. for 3 hours, while stirring. After the reaction mixture had been cooled, the precipitated crystals were filtered off with suction and recrystallized from toluene. There were thusly obtained 0.7 g. (20.8% of theory) 2 - [2 - (5-nitro-2-furyl)-vinyl]-5-chloro-1,8-naphthyridine, which had a melting point of 264° C. (decomp.).

EXAMPLE 12

2-[2-(5-nitro-2-furyl)-vinyl]-5-acetamino-1,8-naphthyridine 4.5 g. 2-methyl-5-amino-1,8-naphthyridine (M.P. 211–212° C.) and 4.0 g. 5-nitrofuran-2-aldehyde in 200 ml. acetic anhydride were heated to 70° C. for 2 hours, while stirring. After cooling the reaction mixture, the precipitated crystals which formed were filtered off with suction and recrystallized from glacial acetic acid. There were recovered 3.0 g. (32.7% of theory) 2-[2-(5-nitro-2-furyl)-vinyl]-5-acetamino-1,8-naphthyridine which had a melting point of 296° C. (decomp.).

EXAMPLE 13

4-[2-(5-nitro-2-furyl)-vinyl]-2-methyl-7-acetamino-1,8-naphthyridine 20.0 g. 7-amino-2,4-dimethyl-1,8-naphthyridine (M.P. 220° C.) and 16.2 g. 5-nitrofuran-2-aldehyde were heated for 3 hours at 100° C. in 200 ml. acetic anhydride. After the cooling of the reaction mixture, the precipitated crystals were filtered off with suction and recrystallized from glacial acetic acid. There were obtained 8.5 g. (21.8% of theory) 4-[2-(5-nitro-2-furyl)-vinyl]-2-methyl-7-acetamino-1,8-naphthyridine, which had a melting point of >360° C. (decomp.).

EXAMPLE 14

4-[2-(5-nitro-2-furyl)-vinyl]-2-methyl-7-amino-1,8-naphthyridine hydrochloride 3.8 g. 4-[2-(5-nitro-2-furyl)-vinyl]-2-methyl - 7 - acetamino-1,8-naphthyridine, prepared by the procedure described in Example 13, were heated under reflux for 8 hours in a mixture of 20 ml. ethanol and 40 ml. concentrated hydrochloric acid. Following cooling of the reaction mixture, the precipitated crystals which formed were filtered off with suction and recrystallized from glacial acetic acid. There were obtained 1.2 g. (32.1% of theory) 4-[2-(5-nitro-2-furyl)-vinyl]-2-methyl - 7 - amino - 1,8-naphthyridine hydrochloride, which had a decomposition point of >360° C.

EXAMPLE 15

2-[2-(5-nitro-2-furyl)-vinyl]-7-methylsulfonamido-1,8-naphthyridine 1.3 g. 2-methyl-7-(bis-methylsulfonyl)-amino-1,8-naphthyridine were heated for one hour at 140° C. with 11 ml. acetic anhydride, 6 ml. glacial acetic acid and 0.7 g. 5-nitrofuran-2-aldehyde. The crystals which were recovered from the ice-cooled solution were then dissolved in 100 ml. hot dimethyl sulfoxide and this solution mixed at ambient temperature with 70.7 ml. of an N/10 sodium hydroxide solution. After 45 minutes, the solution was acidified with 2 N hydrochloric acid, diluted with a fivefold amount of water and, after a further hour, filtered off with suction and washed. Following recrystallization from dioxan/dimethyl formamide, there were obtained 0.8 g. 2-[2-(5-nitro-2-furyl)-vinyl]-7-methylsulfonamido-1,8-naphthyridine, which had a melting point of 217–218° C. (decomp.).

The 2-methyl-7-(bis - methylsulfonyl)-amino-1,8-naphthyridine used as starting material was prepared by the method as follows:

6.5 g. 2-methyl-7-amino-1,8-naphthyridine were suspended in a mixture of dioxan and triethylamine (6.4) and, within the course of 20 minutes, mixed with a solution of 15 g. methanesulfochloride in 50 ml. dioxan. The reaction mixture was then stirred for one hour at 50° C. and, after cooling, filtered off with suction. The crystals thus obtained were washed with a little dioxan, suspended in 70 ml. water, mixed with 2 N hydrochloric acid until an acid reaction had been obtained and again filtered off. The crystals which were then recovered were washed with water and recrystallized from dioxan. There were obtained 1.3 g. 2-methyl-7-(bis-methylsulfonyl)-amino-1, 8-naphthyridine, which had a melting point of 228–230° C.

EXAMPLE 16

2-[2-(5-nitro-2-furyl)-vinyl]-7-hydroxymethylamino-1,8-naphthyridine 8 g. 2-methyl-7-amino-1,8-naphthyridine were boiled under reflux for 30 minutes in 105 ml. acetic anhydride. Thereafter, 11 g. 5-nitrofuran-2-aldehyde were added and the resulting reaction mixture boiled for a further hour. After cooling, the product which crystallized out was saponified in a mixture of 47 ml. 5 N hydrochloric acid and 47 ml. glacial acetic acid by boiling under reflux.

Following cooling, the reaction mixture was filtered using suction and the product which was recovered dissolved in 180 ml. of a boiling mixture of 80% dimethyl formamide and 20% 2 N hydrochloric acid. The product obtained following the addition of an excess of aqueous ammonia solution was dissolved in 200 ml. dimethyl formamide and mixed with a solution of 40 ml. 40% aqueous formaldehyde in 40 ml. dimethyl formamide. After 90 minutes, the crude product was filtered off with suction, successively washed with dimethyl formamide and ether and dried in a vacuum first for 3 hours at 120° C. and then for 2 hours at 150° C. There were obtained 11.40 g. 2 - [2-(5-nitro-2-furyl)-vinyl]-7-hydroxymethyl-amino-1,8-naphthyridine, which had a melting point of 192–196° C. (decomp.).

EXAMPLE 17

2-[2-(5-nitro-2-furyl)-vinyl]-7-(β-hydroxyethyl)-amino-1,8-naphthyridine 4.8 g. 2-methyl-7-(β-hydroxyethyl)-amino - 1,8 - naphthyridine were heated for 30 minutes at 120° C. with 24 ml. acetic anhydride and, after the addition of 4 g. 5-nitrofuran-2-aldehyde, heated for a further 30 minutes at 100° C. Following the cooling of the reaction mixture, the precipitated crystals which had formed were filtered off with suction and successively washed with glacial acid and ether. The crude product thusly obtained was, without further purification, heated for 30 minutes to 80° C. in 110 ml. of a mixture of dioxan and 2 N hydrochloric acid (2:1). The cooled reaction mixture was then filtered with suction, dissolved in 500 ml. water nad neutralized with a dilute solution of ammonia. The crude product which thereby precipitated out was thereafter recrystallized from dioxan/dimethyl formamide (8:2). There were recovered 1.1 g. 2-[2-(5-nitro-2-furyl)-vinyl]-7-(β-hydroxyethyl)-amino-1,8-naphthyridine, which had a melting point of 234–235° C. (decomp.).

The 2-methyl-7-(β-hydroxyethyl)-amino-1,8-naphthyridine used as starting material was prepared according to the following method:

4.35 g. 2-methyl-7-chloro-1,8-naphthyridine were dissolved in 7.4 g. β-aminoethanol and heated to 120° C. for 30 minutes. The cooled reaction mixture was mixed with 29 ml. water and then, while being cooled with ice, mixed with 36.5 ml. concentrated sodium hydroxide solution. The resulting reaction mixture was thereafter extracted several times with dioxan, the combined extracts dried over anhydrous sodium carbonate and the solvent then stripped off under vacuum. There were obtained 4.8 g. 2-methyl-7-(β - hydroxyethyl) - amino-1,8-naphthyridine in the form of an oil.

The bacteriostatic activity of the compounds in accordance with the invention was evaluated in vitro with respect to the organisms as set out in the following table.

The absolute bacteriostatic minimal concentration was determined for the following compounds of the invention and for the known or comparison compounds as hereinafter set out:

A—2-[2-(5-nitro-2-furyl)-vinyl]-7-amino-1,8-naphthyridine

B—2-[2-(5-nitro-2-furyl)-vinyl]-7-hydroxy-1,8-naphthyridine

C—2-[2-(5-nitro-2-furyl)-vinyl]-7-azido-1,8-naphthyridine

D—4-[2-(5-nitro-2-furyl)-vinyl]-2,7-diamino-1,8-naphthyridine

E—2-[2-(5-nitro-2-furyl)-vinyl]-7-hydroxy-1,8-naphthyridine

F—2-[2-(5-nitro-2-furyl)-vinyl]-7-hydroxymethylamino-1,8-naphthyridine

G—2-[2-(5-nitro-2-furyl)-vinyl]-7-(β-hydroxyethyl)-amino-1,8-naphthyridine

H—2-[2-(5-nitro-2-furyl)-vinyl]-7-methylsulfonamido-1,8-naphthyridine

TABLE I.—BACTERIOSTATIC ACTIVITY IN VITRO

| Organism class | Organism | Absolute bacteriostatic minimal concentration in μg./ml. | | | | | | | | | | | | | | | | | |
|---|---|---|---|---|---|---|---|---|---|---|---|---|---|---|---|---|---|---|
| | | A | B | C | D | E | F | G | H | I | J | K | L | M | N | O | P | Q | R |
| Gram positive organisms | Staphylococcus aureus, SG 511 | 0.008 | 0.008 | 0.016 | 0.031 | 0.016 | 0.016 | 0.008 | 0.016 | 0.031 | 0.125 | 0.031 | 0.016 | 0.125 | 0.25 | 8 | 2 | 4 | 0.016 |
| | Streptococcus pyogenes Aronson | 0.008 | 0.008 | 0.031 | 0.016 | 0.016 | 0.016 | 0.016 | 0.031 | 0.031 | 0.5 | 0.031 | 0.016 | 0.125 | 1 | 2 | 4 | 4 | 0.031 |
| | Streptococcus faecalis | 0.001 | 0.002 | 0.016 | 0.062 | 0.001 | 0.004 | 0.008 | 0.008 | 0.004 | 0.062 | 0.004 | 0.008 | 0.062 | 0.062 | 16 | 4 | 4 | 16 |
| Gram negative organisms | Escherichia coli | 0.004 | 0.004 | 0.008 | 0.062 | 0.008 | 0.016 | 0.031 | 0.125 | 0.016 | 0.031 | 0.125 | 0.031 | 0.125 | 0.125 | 8 | 0.125 | 4 | 0.031 |
| | Proteus mirabilis | 0.125 | 0.25 | 0.125 | 2 | 0.016 | 0.5 | 2 | 0.25 | 0.5 | 1 >16[1] | 1 >16[1] | 0.25 | 2 | 128 | 64 | 32 | 128 | >16 |
| | Psuedomonas aeruginosa | 0.5 | 0.5 | 0.5 | 0.5 | 0.25 | | | 4 | 0.5 | | | 1 | 4 | 128 | >128 | 64 | 128 | |

[1] Compound difficulty soluble, experiment run starting at 16 μg./ml.

I—2-[2-(5-nitro-2-furyl)vinyl]-5-hydroxy-1,8-naphthyridine
J—2-[2-(5-nitro-2-furyl)-vinyl]-5-chloro-1,8-naphthyridine
K—4-[2-(5-nitro-2-furyl)-vinyl]-2-methyl-7-acetamino-1,8-naphthyridine
L—4-[2-(5-nitro-2-furyl)-vinyl]-2-methyl-7-amino-1,8-naphthyridine
M—2-[2-(5-nitro-2-furyl)-vinyl]-5-acetamino-1,8-naphthyridine
N—2-[2-(5-nitro-2-furyl)-vinyl]-5-ethoxy-1,8-naphthyridine
O—5-nitro-furfurol-semicarbazone (furacin)
P—N-(5-nitro-furfurylidene)-3-amino-2-oxazolidone (furoxon)
Q—N-(5-nitro-furfurylidene)-1-amino-hydantoin (furadantin)
R—2-[2-(5-nitro-2-furyl)-vinyl]-5-hydroxy-6-carbethoxy-1,8-naphthyridine The results are set out in Table 1.

The acute oral toxicity was determined in mice. The results are shown in the following table:

TABLE II

Compound:
- Q [1] _____ $LD_{50}$=250 mg./kg.
- Q [2] _____ $LD_{50}$=138 mg./kg.
- O [1] _____ $LD_{50}$=230 mg./kg.
- P [1] _____ $LD_{50}$=1280 mg./kg.
- A _____ $LD_{50}$=>1000 mg./kg.
- B _____ $LD_{50}$=>1000 mg./kg.
- C _____ $LD_{50}$=>1000 gm./kg.
- E _____ $LD_{50}$=>1000 mg./kg.

[1] Published value 1964.
[2] Unpublished value 1968.

The compounds in accordance with the instant invention are anti-microbials and have been found to be bactericidal to the pathogens found in surface infections, gram negative as well as gram positive. They additionally have utility as agents for routine treatment of acute and chronic bacterial infections of the urinary tract, including those caused by Proteus ap. Further they lend themsalves because of their properties to use in the prevention of treatment of mixed surface infections of wounds, severe burns, cutaneous ulcers, pyodermas, osteomyelitis, preparation of wounds and burns for skin grafting and prevention of infecion of grafts and donor sites.

The compounds of the invention can be employed in the form of aqueous solutions or suspensions thereof, as for instance, in the form of an 0.01 to 0.05% aqueous suspension or solution; in the form of solutions in non-aqueous, hygroscopic liquid vehicles such as polyethylene glycol, for instance, 0.1–0.5% solutions in polyethylene glycol; incorporation into a water-soluble ointment-like base (concentration 0.1–0.5%) or in a powder base composed for instance of water-soluble polyethylene glycols (concentration 0.1–0.5%); or in a form suitable for ingestion. Thus, a preferred form is a tablet containing 50–200 mg. of active compound. Depending on the condition, symptomatic and laboratory responses 100–400 mg. per day can be administered. Another preferred form for orally administering the compounds of the invention is in the form of a suspension thereof in a water miscible flavored gel. Such a gel can contain from 1 to 10 mg. of compound per cc.

What is claimed is:

1. A member selected from the group of nitrofuran derivatives having the formula:

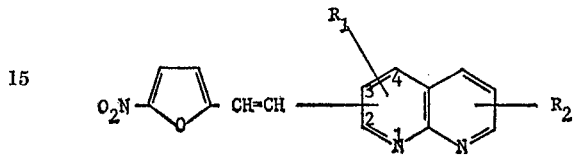

wherein $R_1$ and $R_2$ each represent a member selected from the group consisting of hydrogen, halogen, hydroxyl, azido, amino, lower alkyl, lower alkanoyloxy, lower alkoxy, lower alkylamino, hydroxyalkylamino, lower alkanoylamino and sulfonylamino; the N-oxides and salts thereof.

2. A compound according to claim 1 designated 2-[2-(5-nitro-2-furyl)-vinyl]-7-amino-1,8-naphthyridine.

3. A compound according to claim 1 designated 2-[2-(5-nitro-2-furyl)-vinyl]-7-hydroxy-1,8-naphthyridine.

4. A compound according to claim 1 designated 2-[2-(5-nitro-2-furyl)-vinyl]-7-azido-1,8-naphthyridine.

5. A compound according to claim 1 designated 2-[2-(5 - nitro - 2 - furyl)-vinyl]-7-hydroxy-1,8-naphthyridine-N-oxide.

6. A compound according to claim 1 designated 2-[2-(5-nitro - 2 - furyl)-vinyl] - 7 - hydroxymethylamino-1,8-naphthyridine.

7. A compound according to claim 1 designated 2-[2-(5-nitro - 2 - furyl)-vinyl]-7-($\beta$-hydroxyethyl)-amino-1,8-naphthyridine.

8. A compound according to claim 1 designated 4-[2-(5-nitro-2-furyl)-vinyl] - 2 - methyl - 7 - amino-1,8-naphthyridine-hydrochloride.

References Cited

UNITED STATES PATENTS

| | | | |
|---|---|---|---|
| 3,518,259 | 6/1970 | Lesher | 260—240 |
| 3,567,716 | 3/1971 | Nishigaki et al. | 260—240 A |

FOREIGN PATENTS

| | | | |
|---|---|---|---|
| 1,526,672 | 4/1968 | France | 260—240 |

JOHN D. RANDOLPH, Primary Examiner

U.S. Cl. X.R.

260—240.1; 424—263

UNITED STATES PATENT OFFICE
CERTIFICATE OF CORRECTION

Patent No. 3,658,796          Dated April 25, 1972

Inventor(s) Herbert Berger et al

It is certified that error appears in the above-identified patent and that said Letters Patent are hereby corrected as shown below:

Col. 2, line 46

| | |
|---|---|
| For | "acid ethane" |
| read | --acid, ethane |

Col. 2, line 59

| | |
|---|---|
| | "cvrystals" |
| should be | --crystals-- |

Col. 3, line 23

| | |
|---|---|
| | "-vinyl-7" |
| should read | -- -vinyl]-7-- |

Col. 6, line 51

| | |
|---|---|
| | "6.5 g." |
| should read | --6.4 g.-- |

Col. 6, line 52

| | |
|---|---|
| | "(6.4) |
| should read | --(6:4)-- |

Col. 7, line 27

| | |
|---|---|
| after | "glacial" |
| insert | --acetic-- |

UNITED STATES PATENT OFFICE
CERTIFICATE OF CORRECTION

Patent No. 3,658,796            Dated April 25, 1972

Inventor(s) Herbert Berger et al

It is certified that error appears in the above-identified patent and that said Letters Patent are hereby corrected as shown below:

| | |
|---|---|
| <u>Col. 7, line 68</u> | |
| After | "naphthyridine" |
| insert | --N-oxide-- |
| <u>Col. 8, Table I</u> | Streptococcus faecalis (under Col. R) "16" |
| should read | --0.016-- |

Signed and sealed this 5th day of December 1972.

(SEAL)
Attest:

EDWARD M. FLETCHER, JR.             ROBERT GOTTSCHALK
Attesting Officer            Commissioner of Patents